(12) United States Patent
Duan et al.

(10) Patent No.: US 12,309,089 B2
(45) Date of Patent: May 20, 2025

(54) DETECTING NON-LINE-OF-SIGHT WIRELESS SIGNAL PATHS

(71) Applicant: QUALCOMM Incorporated, San Diego, CA (US)

(72) Inventors: Weimin Duan, San Diego, CA (US); Jingchao Bao, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/929,664

(22) Filed: Sep. 2, 2022

(65) Prior Publication Data
US 2024/0080149 A1 Mar. 7, 2024

(51) Int. Cl.
| | |
|---|---|
| H04L 5/00 | (2006.01) |
| H04W 64/00 | (2009.01) |
| H04W 72/044 | (2023.01) |
| H04W 72/0446 | (2023.01) |
| H04W 72/23 | (2023.01) |

(52) U.S. Cl.
CPC .......... *H04L 5/0048* (2013.01); *H04W 64/00* (2013.01); *H04W 72/0446* (2013.01); *H04W 72/046* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 9,755,797 B2 | 9/2017 | Wu et al. | |
| 2002/0115448 A1 | 8/2002 | Amerga et al. | |
| 2014/0171105 A1 | 6/2014 | Al-Mufti et al. | |
| 2016/0295366 A1 | 10/2016 | Priyanto et al. | |
| 2019/0223140 A1 | 7/2019 | Grossmann et al. | |
| 2021/0092558 A1* | 3/2021 | Duan | H04L 25/03343 |
| 2023/0258759 A1* | 8/2023 | Wang | G01S 1/08 |
| | | | 455/456.1 |
| 2024/0077568 A1 | 3/2024 | Duan et al. | |

FOREIGN PATENT DOCUMENTS

| | | |
|---|---|---|
| WO | 2021041151 | 3/2021 |
| WO | 2022015965 A1 | 1/2022 |
| WO | 2022164596 A1 | 8/2022 |

OTHER PUBLICATIONS

International Search Report and Written Opinion—PCT/US2023/069406—ISA/EPO—Oct. 12, 2023.

* cited by examiner

*Primary Examiner* — Clemence S Han
(74) *Attorney, Agent, or Firm* — Thien T. Nguyen

(57) ABSTRACT

Techniques for indicating a type of non-line-of-sight (NLOS) wireless signal path in a wireless communication network are described. In some embodiments, a method thereof may include receiving a plurality of reference signals, the plurality of reference signals originating from a respective plurality of wireless network nodes; determining at least one NLOS wireless signal path based on the plurality of reference signals; determining whether or not the at least one NLOS wireless signal path is introduced by a repeater of the wireless communication network based at least on a presence or an absence of a commonality among the plurality of reference signals; and indicating to a network entity whether the at least one NLOS wireless signal path is introduced by the repeater or not.

30 Claims, 9 Drawing Sheets

DETECTING NON-LINE-OF-SIGHT WIRELESS SIGNAL PATHS

BACKGROUND

1. Field of Disclosure

The present disclosure relates generally to the field of wireless communications, and more specifically to detecting non-line-of-sight (NLOS) wireless signal paths between user equipment (UE) and wireless network nodes.

2. Description of Related Art

Positioning and communication via a wireless network depend on unobstructed signal paths between wireless devices, such as between a wireless network node (e.g., base station, access point) and a user device (e.g., UE). There are scenarios in which what would otherwise be line-of-sight (LOS) signals having direct path from the source to the receiver are obstructed by the physical environment (e.g., surfaces, distance between devices). In such cases, a network-controlled repeater may maintain a link between the wireless network node and the repeater and a link between the repeater and a UE, allowing signals and data to be relayed between the network node and the UE.

BRIEF SUMMARY

In one aspect of this disclosure, a method of indicating a type of non-line-of-sight (NLOS) wireless signal path in a wireless communication network is disclosed. In some embodiments, the method includes: receiving a plurality of reference signals, the plurality of reference signals originating from a respective plurality of wireless network nodes; determining at least one NLOS wireless signal path based on the plurality of reference signals; determining whether or not the at least one NLOS wireless signal path is introduced by a repeater of the wireless communication network based at least on a presence or an absence of a commonality among the plurality of reference signals; and indicating to a network entity whether the at least one NLOS wireless signal path is introduced by the repeater or not.

In another aspect of this disclosure, a device is disclosed. In some embodiments, the device includes: one or more network interfaces; memory; and one or more processors communicatively coupled to the one or more network interfaces and the memory, and configured to: receive a plurality of reference signals, the plurality of reference signals originating from a respective plurality of wireless network nodes; determine at least one non-line-of-sight (NLOS) wireless signal path in the wireless communication network based on the plurality of reference signals; determine whether or not the at least one NLOS wireless signal path is introduced by a repeater of the wireless communication network based at least on a presence or an absence of a commonality among the plurality of reference signals; and indicate to a network entity whether the at least one NLOS wireless signal path is introduced by the repeater or not.

In another aspect of this disclosure, a non-transitory computer-readable apparatus is disclosed. In some embodiments, the non-transitory computer-readable apparatus includes a storage medium, the storage medium including a plurality of instructions configured to, when executed by one or more processors, cause a computerized apparatus to: receive a plurality of reference signals, the plurality of reference signals originating from a respective plurality of wireless network nodes; determine at least one non-line-of-sight (NLOS) wireless signal path in a wireless communication network based on the plurality of reference signals; determine whether or not the at least one NLOS wireless signal path is introduced by a repeater of the wireless communication network based at least on a presence or an absence of a commonality among the plurality of reference signals; and indicate to a network entity whether the at least one NLOS wireless signal path is introduced by the repeater or not.

In another aspect of this disclosure, an apparatus is disclosed. In some embodiments, the apparatus includes: means for receiving a plurality of reference signals, the plurality of reference signals originating from a respective plurality of wireless network nodes; means for determining at least one NLOS wireless signal path in a wireless communication network based on the plurality of reference signals; means for determining whether or not the at least one NLOS wireless signal path is introduced by a repeater of the wireless communication network based at least on a presence or an absence of a commonality among the plurality of reference signals; and means for indicating to a network entity whether the at least one NLOS wireless signal path is introduced by the repeater or not.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
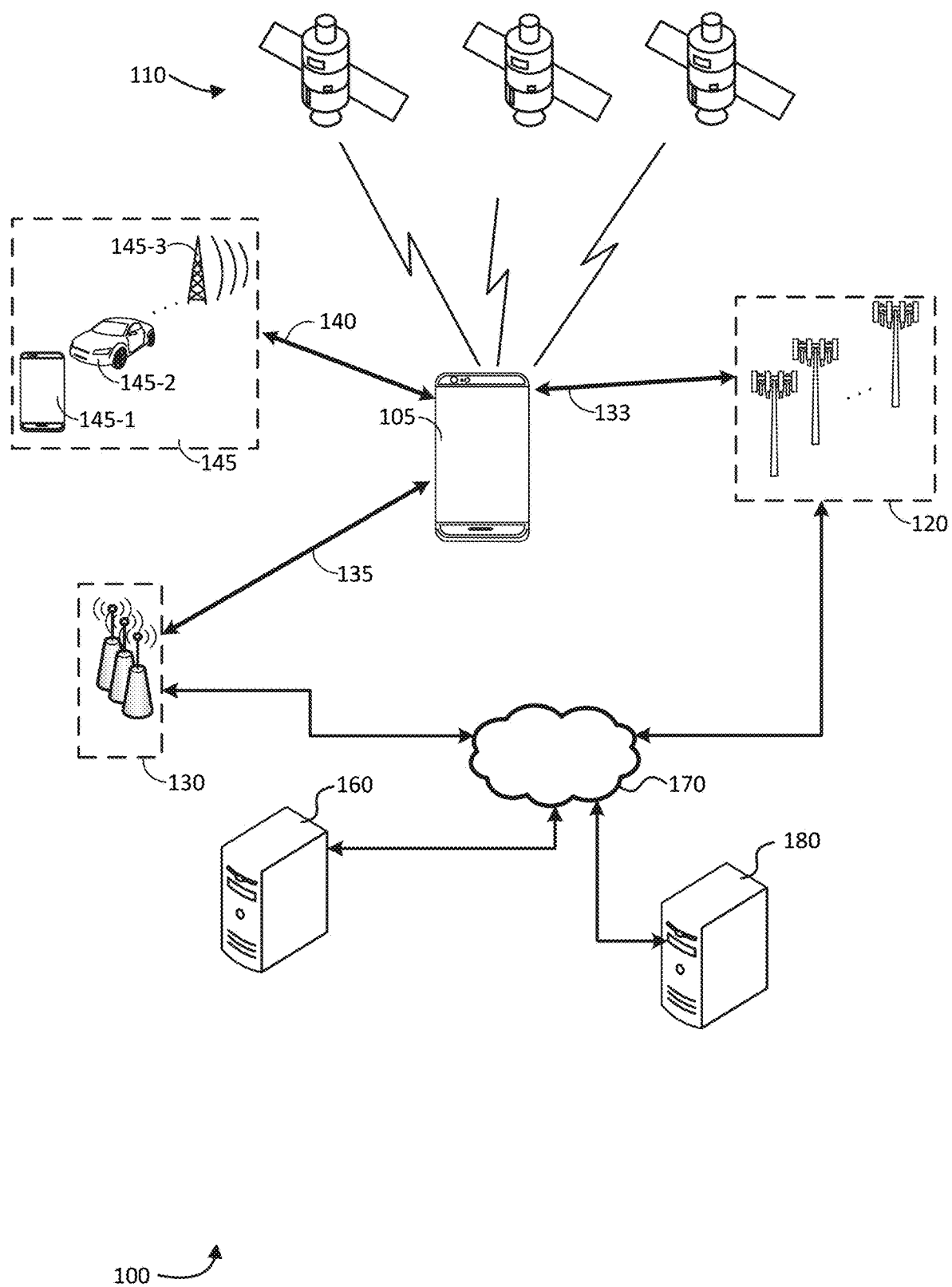
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

Network-controlled repeaters may be used to extend network coverage on various radio frequency (RF) spectra and bandwidths, such as the sub-6 GHz spectrum (Frequency Range 1 (FR1)), or higher-frequency bands allocated between 24 and 300 GHz (also referred to as millimeter wave, mmWave, or Frequency Range 2 (FR2). Extension of transmissions can allow RF signals to cover longer distances or be received on the other side of a physical obstruction through a non-line-of-sight (NLOS) signal path, which occurs outside of LOS between the transmitter and receiver. For example, a physical obstruction may block LOS transmission between a UE and a network node, but a repeater may allow transmission around the physical obstruction. Repeaters may be particularly useful for propagating signals having high data rates but shorter communication ranges, and may ensure signal integrity for outdoor environments, power- or path-loss scenarios, or outdoor-to-indoor coverage, e.g., in wireless networks that have adopted FR1 or FR2. Hence, network operators may deploy repeaters for coverage extension in wireless communication networks as a cost-effective solution.

However, repeaters may be transparent to UEs. That is, a UE may not know whether a repeater is deployed or not, and may not be aware whether a connection to a wireless network node is made through a repeater or directly to the wireless network node. A typical repeater simply performs amplify-and-forward operation of RF signals, so the signals may propagate in different directions or be received at the same location of the repeater. The lack of awareness of the existence of the repeater by the UE can introduce significant positioning errors.

More specifically, from the UE's perspective, positioning measurements are based on the first arrival path detection with a Positioning Reference Signal (PRS). The first arrival path may refer to a LOS path at the receiver side. Some examples of such positioning measurements include Reference Signal Time Difference (RSTD), time of arrival (TOA), and angle of arrival (AOA). Other examples of positioning measurements are listed below. In some scenarios, the UE may be positioned within a coverage hole, an area within the wireless network that is not covered by any wireless node, resulting in lack of monitoring of that area. While in the coverage hole, the UE may still be able to detect a first arrival path propagated from a wireless network node (e.g., gNB) to the repeater to the UE. However, direct signal paths from nodes to UE are not detected while the UE is in the coverage hole. Similarly, a UE within a coverage hole cannot send signals directly to the wireless network node, but can send signals to a repeater capable of relaying the signals to the wireless network node.

The presence of the repeater large positioning errors may occur for the UE in a coverage hole. If the UE reports a measurement based on the first arrival path detection, the resulting positioning or localization may essentially correspond to the repeater's location instead of that of the UE. If the measurement is based on round trip signal propagation time (RTT), where RTT-based positioning is based on signals that are both transmitted and received by the UE, each range measurement additionally contains the range between the UE and the repeater, leading to even more errors.

For these reasons, there is a need to enhance UE positioning in wireless networks deployed with repeaters, or more generally, UE positioning in NLOS scenarios. When NLOS is detected between UE and network nodes, the network can address potential positioning errors, e.g., using alternate positioning techniques. Additional details will follow after an initial description of relevant systems and technologies.

FIG. 1 is a simplified illustration of a positioning system 100 in which a UE 105, location server 160, and/or other components of the positioning system 100 can use the techniques provided herein for detecting non-line-of-sight wireless signal paths associated with UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
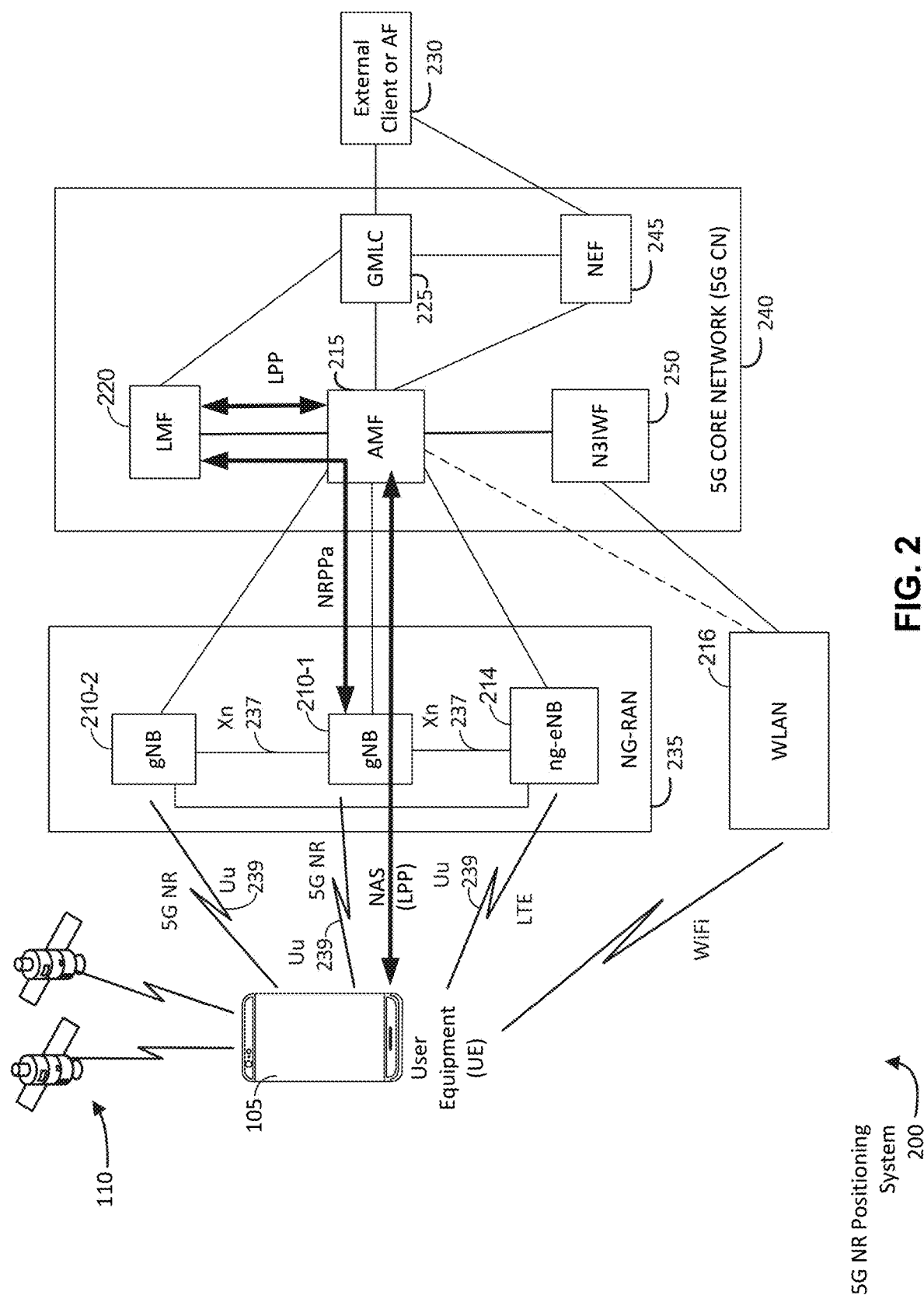
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNB s 214, Wireless Local Area Networks (WLANs) 216, Access and Mobility Management Functions (AMFs) 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
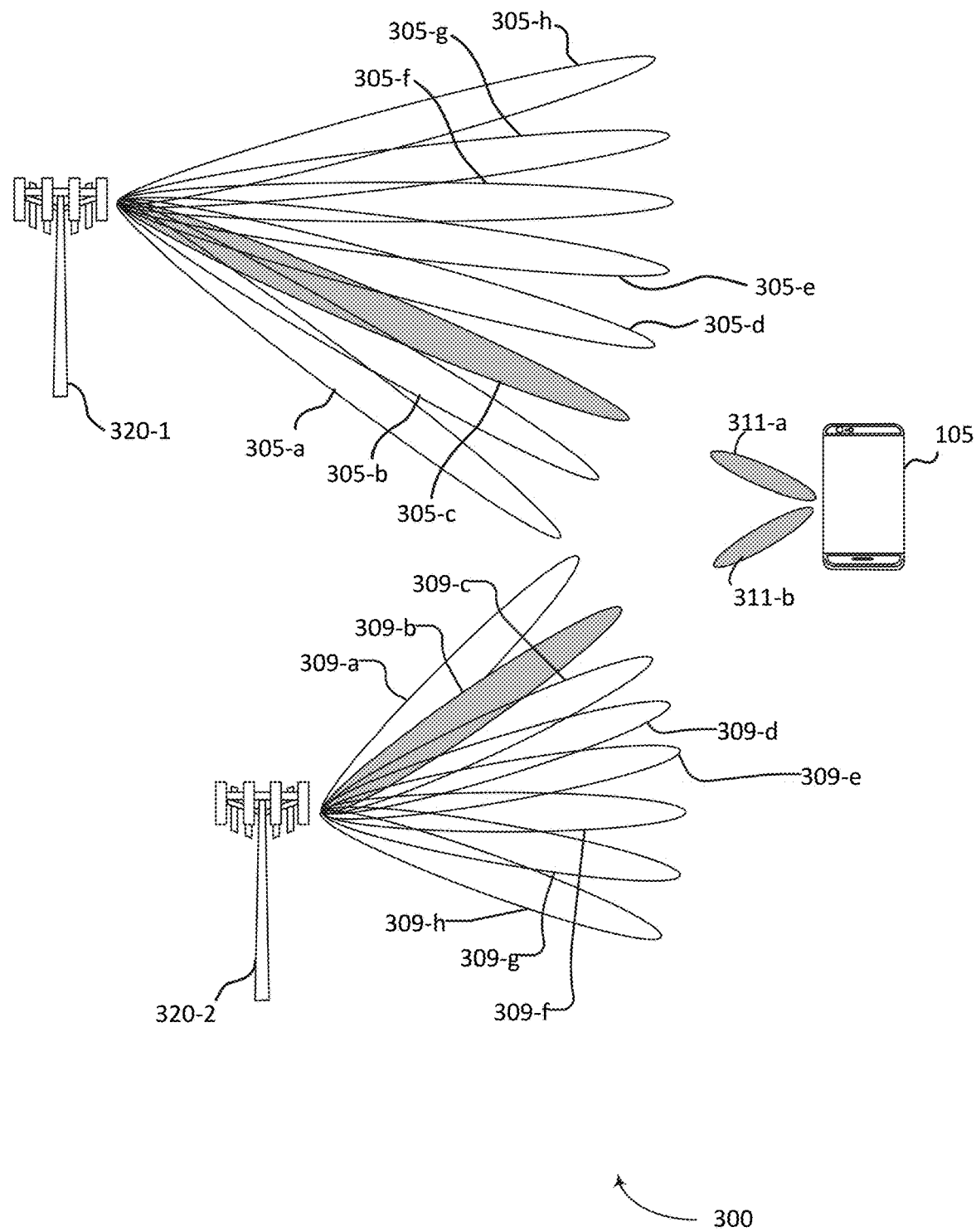
FIG. 3 is a diagram showing an example of how beamforming may be performed, according to some embodiments.

FIG. 3 is a diagram illustrating a simplified environment 300 including two base stations 320-1 and 320-2 (which may correspond to base stations 120 of FIG. 1 and/or gNB s 210 and/or ng-eNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each directional beam may have a beam width centered in a different direction, enabling different beams of a base station 320 to correspond with different areas within a coverage area for the base station 320.

Different modes of operation may enable base stations 320-1 and 320-2 to use a larger or smaller number of beams. For example, in a first mode of operation, a base station 320 may use 16 beams, in which case each beam may have a relatively wide beam width. In a second mode of operation, a base station 320 may use 64 beams, in which case each beam may have a relatively narrow beam width. Depending on the capabilities of a base station 320, the base station may use any number of beams the base station 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a base station 320 may use beam sweeping. Beam sweeping is a process in which the base station 320 may send an RF signal in different directions using different respective beams, often in succession, effectively "sweeping" across a coverage area. For example, a base station 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-*a*, 305-*b*, 305-*c*, 305-*d*, 305-*e*, 305-*f*, 305-*g*, and 305-*h*, and the base station 320-2 produces a set of RF reference signals that includes Tx beams 309-*a*, 309-*b*, 309-*c*, 309-*d*, 309-*e*, 309-*f*, 309-*g*, and 309-*h*. As noted, because UE 105 may also include an antenna array, it can receive RF reference signals transmitted by base stations 320-1 and 320-2 using beamforming to form respective receive beams (Rx beams) 311-*a* and 311-*b*. Beamforming in this manner (by base stations 320 and optionally by UEs 105) can be used to make communications more efficient. They can also be used for other purposes, including taking measurements for position determination (e.g., AoD and AoA measurements).

As discussed herein, in some embodiments, TDOA assistance data may be provided to a UE 105 by a location server (e.g., location server 160) for a "reference cell" (which also may be called "reference resource"), and one or more "neighbor cells" or "neighboring cells" (which also may be called a "target cell" or "target resource"), relative to the reference cell. For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to TDOA or some other position method.

PRS-based positioning by a UE 105 may be facilitated by indicating the serving cell for the UE 105 in the TDOA assistance data (e.g., with the reference cell indicated as being the serving cell).

In some embodiments, TDOA assistance data may also include "expected Reference Signal Time Difference (RSTD)" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, may define a search window for the UE 105 within which the UE 105 is expected to measure the RSTD value. TDOA assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal ToA or RSTD.

Using the RSTD measurements, the known absolute or relative transmission timing of each cell, and the known position(s) of wireless node physical transmitting antennas for the reference and neighboring cells, the UE position may be calculated (e.g., by the UE 105 or by the location server 160). More particularly, the RSTD for a neighbor cell "k" relative to a reference cell "Ref," may be given as (ToA$_k$-ToA$_{Ref}$), where the ToA values may be measured modulo one subframe duration (1 ms) to remove the effects of measuring different subframes at different times. ToA measurements for different cells may then be converted to RSTD measurements and sent to the location server 160 by the UE 105. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 105 position may be determined.

Non-Line-of-Sight (NLOS) Environment

Figure 4:
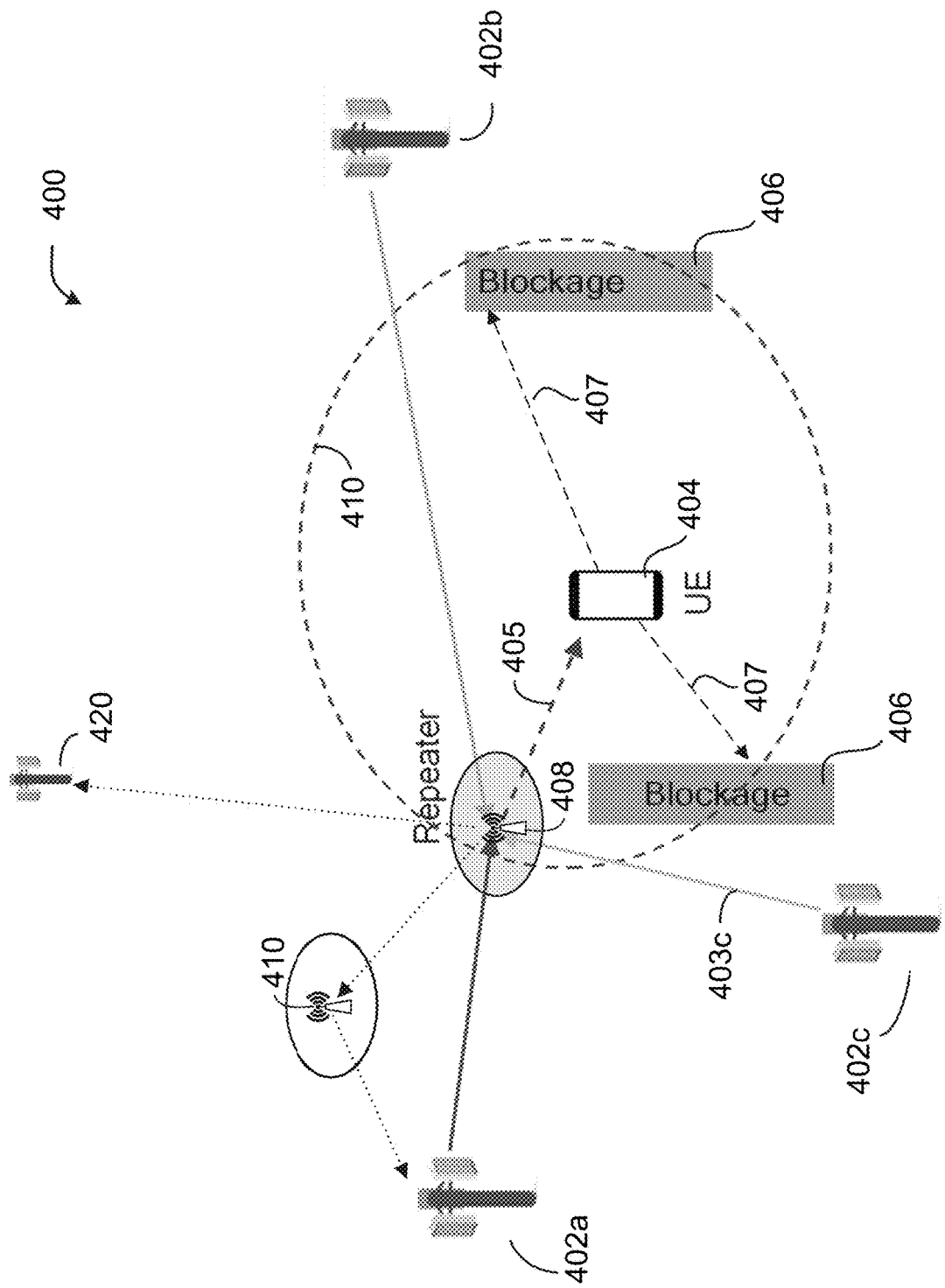
FIG. 4 is a diagram showing an example scenario within a wireless network having wireless network nodes, a UE within a coverage hole with nearby environmental obstructions, and a repeater.

FIG. 4 is a diagram showing an example scenario 400 within a wireless network having multiple wireless network nodes 402a-402c, a UE 404 within a coverage hole 410 with nearby environmental obstructions, and a repeater 408. In some embodiments, wireless network nodes may be gNBs, base stations, or other types of access points capable of Wi-Fi or cellular communication with the UE 404.

In the illustrated scenario, UE 404 may be surrounded by physical objects 406 blocking RF signal propagation 407 from one side to another side of the physical objects 406 while the UE 404 is within the coverage hole 410. For example, while in the coverage hole 410, the UE 404 may be unable to communicate directly (e.g., via LOS signal propagation) with wireless network node 402b because of blockage to the right of the UE 404, or communicate directly with wireless network node 402c because of blockage to the left of the UE 404. Examples of the physical objects 406 may include buildings, the ground, walls, ceiling, trees, hills, mountains, and other types of surfaces. In "urban canyon" environments, there may be numerous such surfaces obstructing LOS signal paths by reflecting or absorbing RF signals from the UE 404 or a wireless network node.

However, the UE 404 may be able to communicate with wireless network nodes 402a-402c via the repeater 408. In some embodiments, the repeater 408 may be a type of wireless network node controlled by the wireless network, which may be configured to (i) receive wireless communications signals from a wireless network node (e.g., gNB) or a mobile device (e.g., UE), (ii) amplify the received signals, and (iii) wirelessly send the signals to the mobile device or another wireless network node. The repeater 408 is essentially a relay point between a transmitter (e.g., UE) and an intended receiver (e.g., gNB).

In some scenarios, the repeater 408 may forward the received signals to another repeater, e.g., repeater 410, if for example, temporary or permanent blockage exists because of an object between the repeater 408 and the wireless network node 402a. Such additional repeaters may amplify and forward signals to other nodes (including, e.g., yet another repeater) received from the previous repeater, e.g., repeater 408.

In some scenarios, the repeater 408 may forward the received signals to a distant wireless network node 420. The distant wireless network node 420 may be so distant that it is outside of the communication range of the UE 404. Even without blockage between the UE 404 and the distant wireless network node 420, they would not be able to communicate with each other via LOS communications without a repeater or other ways to amplify the signals. Hence, in some implementations, the repeater 408 may have capabilities for beyond line-of-sight (BLOS) communication, which may refer to longer-distance (e.g., few to thousands of miles) communications amplified by a repeater.

In the scenario 400 depicted in FIG. 4, the repeater 408 may be capable of receiving and sending signals with the UE 404 and each of the wireless network nodes 402a-402c, enabling data communication between the UE 404 and any of the wireless network nodes 402a-402c. For instance, the repeater 408 may receive signals from the wireless network node 402c via a signal path 403, and convey the signals via a signal path 405. These signal paths 403, 405 are each LOS signal paths, but communications through these signal paths 403, 405 may constitute NLOS signal propagation introduced or enabled by the repeater 408.

UE 404 in the coverage hole 410 may be unable to detect signal paths from any of the shown wireless network nodes 402a-402c. For a single PRS resource, the UE 404 may be unable to detect whether the first arrival path is from one of the wireless network nodes 402a-402c or from the repeater 408. If UE 404 were not in the coverage hole 410 (e.g., near one of the wireless network nodes 402a-402c and in line of sight of each other), the UE 404 would be more likely to detect the first arrival path from the wireless network node. However, in the scenario 400, the UE 404 may still treat the signal path from the repeater 408 as the first arrival path from a wireless network node, as the repeater 408 is transparent to the UE 404. This transparency of the repeater 408 in a NLOS scenario (the NLOS scenario not being known to the UE 404 or the network) may result in errors in positioning of the UE 404. The following approaches may allow detection of NLOS and allow the UE 404 or the network to address the NLOS issue for positioning purposes, etc.

1. Crowdsourcing for Detection of NLOS Introduced by a Repeater

In some embodiments, the UE 404 may be one of multiple UEs (not shown) within the coverage hole 410. In some implementations, UE-based positioning may be performed, in which case the UE 404 tries to report its location to the location server (e.g., LMF 220), e.g., with assistance data received from the location server. Other UEs within a coverage hole (which may not yet be known) may report their locations or have already reported their locations based on the assistance data, e.g., within a period of time preceding the reported location of UE 404.

If multiple UEs seemingly report a same or substantially similar positioning fix to the location server, it is very likely that the location data from the UEs is unreliable and that these UEs are in a coverage hole (e.g., coverage hole 410). Since the UE-based positioning involves UEs calculating their own positions (based on, e.g., measurements with other network nodes, beam pattern information, UL-DL Time Division Duplex (TDD) configuration, assistance data such as reference time and reference position, or non-3GPP or non-RAT (radio access technology) methods), yet the wireless network node (e.g., gNB) receives location data of UEs from a single repeater, positions of UEs that are actually in different locations but determined to appear to be clustered in a similar location may be indicative of NLOS caused by a repeater. Hence, the location server can identify the coverage hole based on a similarity or a commonality among the positioning information from the UEs (e.g., location data from the UEs). In some implementations, the extent to which the location data is substantially similar may be based on a distance threshold and/or a quantity of UEs having location data within the distance threshold.

In some implementations, network-based positioning may be performed, in which case the location server may group the UEs having a similar positioning fix, and determine that it is very likely these UEs are in the coverage hole.

In some implementations, the network (e.g., the location server or LMF) may be aware of and consider additional information, such as the number of repeaters (e.g., in a particular geographic area or within the network in total) and/or the location(s) of the repeater(s) to further enhance the detection probability and/or reduce false identifications of a coverage hole. An example of using the location of a repeater in conjunction with the location data as noted above is to determine that a UE is within a coverage hole, or a higher likelihood that the UE is within the coverage hole, if the UE has a positioning fix close to the repeater.

2. Uplink Measurement-Based Detection of NLOS Introduced by a Repeater

In some embodiments, the network (e.g., location server) may request multiple UEs to send respective UL-SRS for AoA estimation. In some implementations, a wireless network node (e.g., gNB) may report AoA to the location server based on the UL-SRS measurement. If the AoA measured at the wireless network node is the same or substantially similar (e.g., within a prescribed AoA threshold or range), then there is a likelihood that the UE 404 is under the coverage of a repeater because the AoA estimations at the wireless network node would be based on signals from the repeater rather than the respective locations of the UEs.

In some implementations, the wireless network node may derive a spatial relationship between the UL-SRS and a corresponding downlink beam defined by, e.g., SSB, CSI-RS, or DL-PRS. To illustrate with an example, referring to FIG. 3, the downlink Tx beam 305-c and the uplink Rx beam 311-a may have a spatial relationship because the wireless network node (e.g., base station 320-1) may receive the UL-SRS via these beams. Similarly, as another example, the downlink Tx beam 309-c may have a spatial relationship with the uplink Rx beam 311-b. These spatial relationships may indicate a match between the uplink reference signal (UL-SRS) and the downlink beam. If all the UL-SRS have the same or substantially similar spatial relationship between the UL-SRS (from multiple UEs) and the downlink beam, then there is a likelihood that the UE 404 is under the coverage of a repeater because the source of the corresponding downlink beam is the wireless network node to the repeater relaying the UL-SRS.

In some variants, the network may request on demand a specific group of UEs to send the SRS, which may reduce false alarms. For example, the location server may have information of a specific group of UEs known to be in different locations (e.g., based on historical locations, or past positioning or localization stored on the network). From this information, the location server may be able to identify rough locations of other UEs around the UE 404 that is suspected under the coverage of a repeater. If the specific group of UEs returns SRS that are substantially similar, then the location server may deduce that at least the group of UEs (which may include UE 404) is within a coverage hole.

3. Downlink Measurement-Based Detection of NLOS Introduced by a Repeater

If the UE 404 has an antenna array capable of real-time orientation calibrations, such as a mmWave or Multiple Input Multiple Output (MIMO) antenna panel with beamforming capabilities, the UE 404 can detect NLOS introduced by a repeater. More specifically, in some embodiments, the UE 404 may measure DL-AoA with PRSes transmitted from different wireless network nodes. For example, the UE 404 may measure PRSes from wireless network nodes (e.g., gNB s) 402a-402c. If the DL-AoA measured with PRS transmitted from different gNB s are the same or substantially similar (e.g., within a prescribed AoA threshold or range), there is a likelihood that the detected PRSes were forwarded by a repeater, indicating a likelihood that NLOS was caused by the repeater and/or that the UE 404 is within a coverage hole.

In some cases, the greater the PRSes measured (e.g., multiple measurements from the same wireless network nodes and/or from a greater number of wireless network nodes), the higher the confidence level or likelihood that the PRSes were forwarded by a repeater.

In contrast, if the UE 404 were not in the coverage hole, the DL-AoA measurements would be expected to be different for PRS transmitted by different gNB s, 4. Repeater on/Off for Coverage Hole Detection In some embodiments, the network (e.g., location server) may schedule an on/off pattern or sequence for a particular known repeater, where the repeater is disabled (turned off), or enabled (turned on). In some cases, the network may use a functionality of a base station (e.g., gNB, RSU) to disable or enable the repeater. For example, the location server may simply cause a base station to disable the repeater. The location server may set a schedule for disabling and enabling the repeater. This on/off command or pattern may be scheduled solely for determining NLOS. In some implementations, the location server may schedule PRS during on periods and off periods, and during the on and off periods, the UE 404 may estimate the first arrival path and measure signal parameters such as RSRP, RSRQ, SNR, etc.

In some implementations, measurements such as TOA (e.g., based on RSTD) may be determined during on and off periods. For example, a difference between TOA while the repeater is on (TOA_on) and TOA while the repeater is off (TOA_off) may be determined. If TOA_on-TOA_off is small (e.g., less than a threshold), or a statistic (e.g., the variance) associated with multiple determinations of the difference is small, then the location server may determine that the UE 404 is likely not within the coverage hole. If there is a large difference or variance in differences between TOA_on and TOA_off measurements, it may be indicative of additional time of flight to and from a repeater. Based on this inference, the location server (or in some embodiments, the UE) may determine that there is a likelihood that the UE 404 is within a coverage hole.

5. UE Mobility-Based Detection of NLOS Introduced by Repeater

In some embodiments, movement or change in location of the UE may be used to determine NLOS caused by a repeater. In some implementations, network-based UE positioning may be performed, where a UE reports its mobility to the network (e.g., location server) and wireless network nodes obtain location measurements for signals transmitted by the UE for the location server to computer an estimated location of the UE. Based on the UE mobility status and UE location fix, the location server may decide whether the UE is under the coverage of a repeater. For example, the UE may report its locations or movement over time, but the location server may receive the same or substantially similar location data from a wireless network node (e.g., gNB) that has obtained location measurements of a repeater instead of the UE. This disparity between the locations reported by the moving UE and the measurements obtained from the wireless network node may be indicative of NLOS introduced by a repeater.

In some implementations, UE-based positioning may be performed, where the UE could leverage its mobility to identify whether the detected path is from the repeater. If the UE is moving, but positioning by the UE is fixed or relatively stable (e.g., within a threshold amount), there is a likelihood that there is NLOS introduced by a repeater, because the assistance data used to determine the UE's location may be affected by the existence and location of the repeater when relayed via the repeater.

6. Indication of Types of NLOS by UE

NLOS indication may be determined and indicated by a UE or a wireless network node (e.g., gNB), where the NLOS indication indicates whether the NLOS is due to the presence of a repeater or not.

In some embodiments, a PRS-common NLOS may be indicated, where the NLOS wireless signal path is invariant of the PRS transmitted by different wireless network nodes (e.g., gNBs) or via different downlink beams. PRS-common NLOS may be indicated when the NLOS is caused by the repeater. In some cases, one or more of the above approaches (e.g., downlink measurement-based detection of NLOS, or repeater on/off) may be used to determine NLOS based on measurements of PRSes originating from the different wireless network nodes. In some implementations, determining that NLOS is invariant of the PRSes transmitted by different wireless network nodes may be based on a commonality among the PRSes. For instance, a spatial relationship may be determined among the plurality of reference signals and a downlink beam from which the plurality of reference signals are received. The spatial relationship may indicate a match between the reference signals and the downlink beam.

In some cases, if the network (e.g., location server, wireless network node) knows the repeater's location, and if the repeater's location maps to the reported NLOS (e.g., based on the PRSes), the repeater could be used as an additional anchor node for positioning, e.g., for use with anchor-based positioning, where a repeater identified by the network may be used as an anchor for positioning. For example, a UE may measure signal parameters (e.g., AoA, AoD) and/or positioning signals (e.g., PRS) with an identified repeater of a known location to identify the presence of NLOS, or even determine a position relative to the repeater.

In some cases, the repeater's location may be unknown or unable to be estimated. Still, a common NLOS may be identified by the UE (or gNB) nonetheless based on invariant PRS.

In some implementations, this PRS-common type of NLOS may be indicated by a corresponding error indication type (e.g., using a unique code or indication) in a positioning parameter such as LPP or NRPPa.

In some embodiments, PRS-specific NLOS may be indicated, where the NLOS introduced by, e.g., the environment, varies across the PRSes transmitted by different wireless network nodes (e.g., gNBs) or beams. This type of NLOS may be more difficult to utilize than the PRS-common NLOS, as the NLOS may correspond to different wireless network nodes or the physical environment (e.g., multiple potential nodes and reflective surfaces), making it difficult to map the locations of the repeater(s) as anchor nodes for localization. In these cases, the PRS ID may be included in a NLOS report (e.g., the UE's indication to the location server), which may assist in locating the repeater in its associated cell.

In some implementations, this PRS-specific type of NLOS may also be indicated by a corresponding error indication type (e.g., using another unique code or indication) in a positioning parameter such as LPP or NRPPa.

In some embodiments, the UE may identify and indicate PRS-common NLOS or PRS-specific NLOS to the location server (e.g., LMF). In some embodiments, a wireless network node (e.g., gNB) may use similar approaches to identify and indicate PRS-common NLOS or PRS-specific NLOS to the location server.

In some implementations, when NLOS is determined or identified using one or more of the above approaches, and/or the type of NLOS is indicated (e.g., PRS-common or PRS-specific), the location server may then address the NLOS, such as by using anchor-based positioning as noted above, or an enhancement to positioning as described below.

Enhancement to Positioning in NLOS Environment

The likely presence of a repeater or NLOS generally may be detected using one or more of the approaches described above. However, there are limitations to positioning in a coverage area (e.g., coverage hole 410) that is caused by, for example, a repeater or physical obstructions causing NLOS. The NLOS signal paths make positioning of a particular UE difficult using positioning or location estimation techniques that leverage network entities of a positioning system implemented within a 3GPP-based communication network such as FIG. 2.

Despite these limitations, positioning of a UE may be enhanced by usage of a different, alternate positioning mode. More pointedly, in some embodiments, positioning of the UE may be supported by GNSS-based positioning in a communication network-GNSS fusion approach. When the NLOS introduced by repeater is detected or indicated, a network-GNSS module or engine may quickly switch to a positioning mode that does not use network-based (e.g., 4G, 5G) fix or measurements. For example, a location server may send a signal to the UE to switch to GNSS mode so that the UE can obtain its location using, e.g., GPS. This location information can then be sent to appropriate communication network entities, e.g., a wireless network node (e.g., gNB) or location server (e.g., LMF). This would obviate the use of a repeater to determine the UE's position, and avoid an unreliable location estimation with a large positioning error resulting from using the communication network.

In some implementations, the switch may occur for a prescribed period of time, or until a criterion has been met. For example, if the UE is no longer in a coverage hole (e.g., based on its unlikelihood when the indications described above are no longer present), the location server may send a signal to the UE to switch back to the original positioning mode (e.g., 3GPP-based). In some cases, the signal to the UE to switch to GNSS mode may include instructions for the UE to switch back on its own if the criterion is met, such that a separate signal from the location server is not required.

In some embodiments, when the NLOS introduced by repeater is detected for a PRS resource, the network-GNSS approach may filter out measurements based on the PRS resource and instead uses GNSS to determine the position of the UE. The UE or the location server (e.g., LMF) may request on demand a cancelation of any remaining or scheduled transmission of PRS, if the location server (or UE) determines that the PRS is associated with the NLOS introduced by repeater. For example, the location server may send a signal to one or more wireless network nodes associated with a repeater (or likely associated with a repeater based on, e.g., known locations of the wireless network nodes and/or proximity to suspected UE in a coverage hole) to stop the transmission of PRS. In some cases, the UE could request directly to a wireless network node (e.g., gNB), or the UE could request to the location server, which can in turn instruct the gNB to stop the transmission of PRS.

In some embodiments, the UE may cancel any remaining transmission of SRS to the network as well.

A location server, or a UE having GNSS capabilities, can thereby use or cause usage of an alternate positioning method (e.g., GNSS) as a contingency when NLOS is detected, and/or reduce communication with the communication network by canceling positioning signals from being exchanged. Implementations using a positioning method or system other than 3GPP or GNSS may be similarly effective, e.g., Wi-Fi positioning and geolocation using probes or beacons exchanged with hotspots or other wireless (e.g., WLAN) access points that may be in LOS.

Methods

Figure 5:
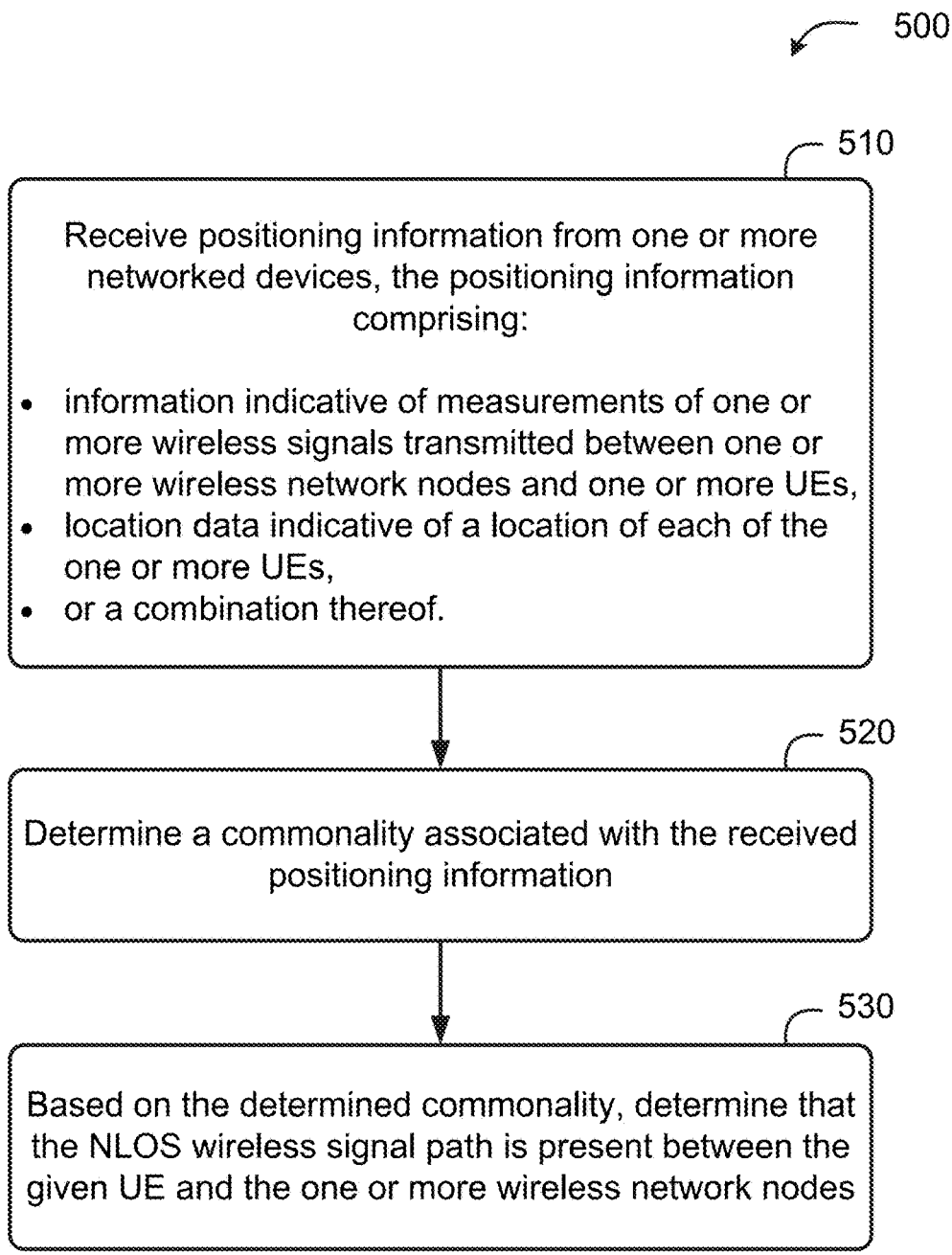
FIG. 5 is a flow diagram of method detecting a non-line-of-sight (NLOS) wireless signal path associated with a given user equipment (UE) in a wireless communication network, according to an embodiment.

FIG. 5 is a flow diagram of a method 500 detecting a non-line-of-sight (NLOS) wireless signal path associated with a given user equipment (UE) in a wireless communication network, according to an embodiment. One or more of the functions of the method 500 may be performed by a computerized apparatus or system. Means for performing the functionality illustrated in one or more of the blocks shown in FIG. 5 may include hardware and/or software components of such computerized apparatus or system, such as, for example, a networked device (e.g., location server), a computer system, or a computer-readable apparatus including a storage medium storing computer-readable and/or computer-executable instructions that are configured to, when executed by at least one processor apparatus, cause the at least one processor apparatus or another computerized apparatus to perform the functionality. Example components of a server are illustrated in, e.g., FIG. 9, which are described in more detail below.

It should also be noted that the operations of the method 500 may be performed in any suitable order, not necessarily the order depicted in FIG. 5. Further, the method 500 may include additional or fewer operations than those depicted in FIG. 5 to accomplish the NLOS detection.

At block 510, the functionality of method 500 may include receiving positioning information from one or more networked devices. In some embodiments, the one or more networked devices include the one or more wireless network nodes, the one or more UEs, or a combination thereof. In some embodiments, the positioning information may include information indicative of measurements of one or more wireless signals transmitted between one or more wireless network nodes and one or more UEs, location data indicative of a location of each of the one or more UEs within the wireless communication network, or a combination thereof. In some implementations, the positioning information may be received from the one or more wireless network nodes. In some scenarios, the one or more wireless network nodes are a plurality of wireless network nodes. Examples of wireless network nodes include gNBs, other cellular-enabled wireless base stations or access points, and WLAN-enabled wireless APs. In some implementations, the location data may be received from the one or more UEs. In some scenarios, the one or more UEs are a plurality of UEs.

In some embodiments, the information indicative of the measurement between the one or more wireless network nodes and the one or more UEs may include (i) angle of arrival (AoA) estimations based on uplink or downlink reference signals between the one or more UEs and the one or more wireless network nodes, or (ii) a spatial relationship between the uplink reference signals of one of the one or more UEs and a downlink beam of one of the one or more wireless network nodes. In some implementations, uplink reference signals may include uplink Sounding Reference Signals (UL-SRS). In some implementations, downlink reference signals may include downlink Positioning Reference Signals (DL-PRS).

Figure 9:
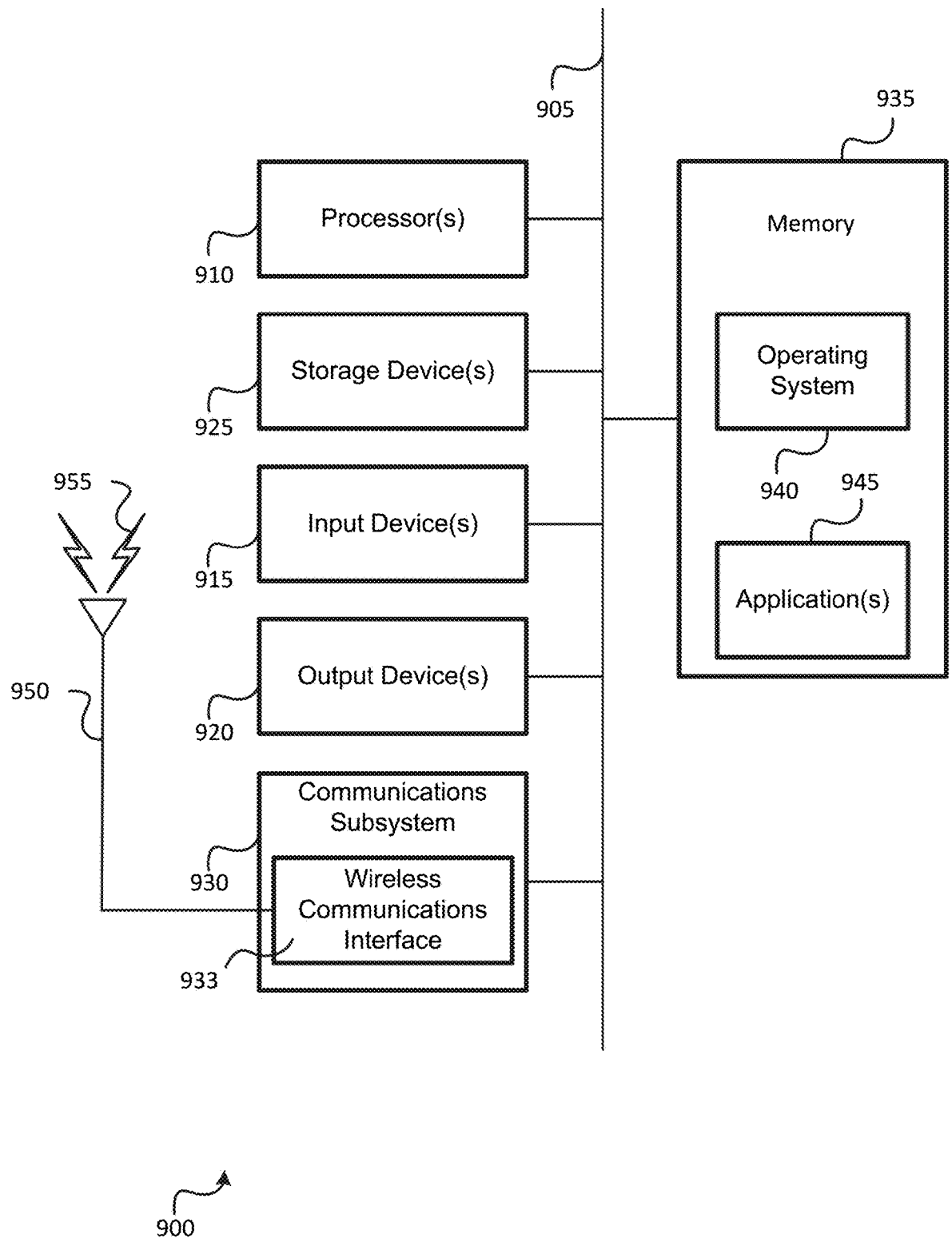
FIG. 9 is a block diagram of an embodiment of a computer system, which can be utilized in embodiments as described herein.

Means for performing functionality at block 510 may comprise processor(s), memory, communications subsystem, wireless communications interface, and/or other components of a server, as illustrated in FIG. 9.

At block 520, the functionality may include determining a commonality associated with the received positioning information.

In some embodiments, the commonality associated with the received positioning information may include (i) the location data indicating that distances among the plurality of UEs are within a threshold amount, or (ii) the AoA estimations based on the uplink reference signals between the plurality of UEs and one of the wireless network nodes vary by less than a threshold amount. In some embodiments, the commonality may include the spatial relationship indicating a match between the uplink reference signals and the downlink beam. In some embodiments, the commonality may include the AoA estimations based on the downlink reference signals of one of the one or more UEs and the plurality of wireless network nodes varying by less than a threshold amount.

Means for performing functionality at block 520 may comprise processor(s), memory, and/or other components of a server, as illustrated in FIG. 9.

At block 530, the functionality may include, based on the determined commonality (e.g., from block 520), determining that the NLOS wireless signal path is present between the given UE and the one or more wireless network nodes. In some scenarios, the NLOS wireless signal path may be introduced by a repeater. A repeater may be a wireless network node configured to provide a wireless data connection to the one or more wireless network nodes, e.g., between a UE and a wireless network node. In such scenarios, the UE may be considered to be in a coverage hole (e.g., coverage hole 410).

For example, the location data may indicate that multiple UEs are close together (e.g., clustered within a threshold distance amount) even though the UEs are not so clustered or are relatively far apart. If a wireless network node (e.g., gNB) or network entity (e.g., location server) receives location data that are substantially similar, this may indicate to the location server a likelihood that the repeater is causing NLOS.

As another example, the AoA estimations based on the uplink reference signals may be substantially similar and vary by less than a threshold angle amount. This also indicate to the location server a likelihood that the repeater is causing NLOS because the AoA estimations at the wireless network node would be based on signals from the repeater rather than the respective locations of the UEs. As another example, a spatial relationship (e.g., a match) between the uplink reference signals (e.g., UL-SRS from multiple UEs and relayed by a repeater) and the downlink beam (e.g., from a gNB) may indicate to the location server a likelihood that the repeater is causing NLOS. In some implementations, the location server may request a specific group of UEs to send the SRS, which may reduce false positives of detecting NLOS. The group of UEs may include UEs that the location server has identified in terms of historical or current location to increase the reliability of SRS measurements.

In some embodiments, the method 500 may further include (e.g., as part of determining that that the NLOS wireless signal path is present) scheduling a repeater on/off pattern. This may include disabling a repeater for a period of time; receiving a first measurement associated with a downlink positioning signal (e.g., DL-PRS) sent to the UE during the period of time; and based on a difference between the first measurement and a second measurement associated with a downlink positioning signal sent to the UE outside the period of time, determining that the UE is within the coverage hole and in wireless data communication with the repeater. In some variants, the determining that the UE is within the coverage hole is based on a statistical metric, such as variance, of the difference between the first measurement and the second measurement.

In some embodiments, the method 500 may further include (e.g., as part of determining that that the NLOS wireless signal path is present) receiving movement information from the UE; and using the location data and the movement information to determine that the UE is within a coverage hole and that the UE is in data communication with the repeater.

In some embodiments, the method 500 may further include (e.g., as part of determining that that the NLOS wireless signal path is present) receiving a plurality of measurements associated with downlink positioning signals (e.g., DL-PRS) sent to one of the one or more UEs; and based on the plurality of measurements varying by more than a threshold amount, determining that the NLOS wireless signal path associated with the UE is introduced by a physical environment of the UE (rather than, e.g., a repeater).

Once it is known (or likely) that positioning is affected by NLOS (e.g., NLOS wireless signal path is caused by a repeater, or is caused by another reason such as physical obstructions or the environment), the network can address the NLOS and still determine a position of the UE without reliance on the wireless communication network (e.g., a data network connected via an infrastructure of base stations, such as that of FIG. 2). In some embodiments, the method 500 may further include, based on the indication that the NLOS wireless signal path is present (from step 30), switching to a second positioning mode different from a first positioning mode used with the one or more wireless network nodes, and determining a position of the UE using the second positioning mode and excluding positioning signals associated with the first positioning mode. The second positioning mode may be different from the first positioning mode based on the wireless communication network, and may include GNSS-based positioning of the UE. This network-GNSS fusion approach may enable the UE and the location server to benefit from the fact that the NLOS wireless signal path is present, and continue to be able to position the UE when the network-based approach becomes less reliable, e.g., because of the coverage hole or other reasons.

Means for performing functionality at block 530 may comprise processor(s), memory, and/or other components of a server, as illustrated in FIG. 9.

Figure 6:
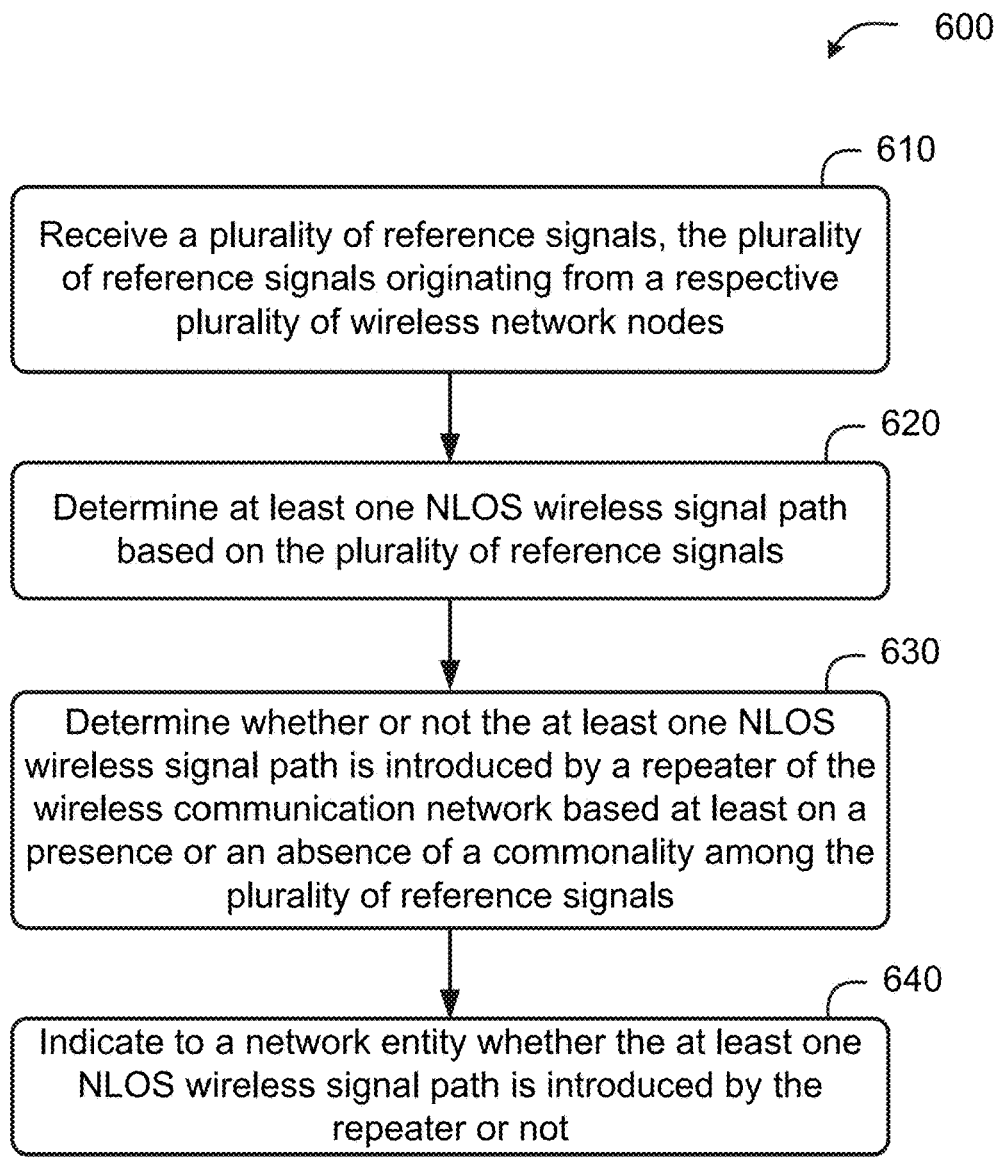
FIG. 6 is a flow diagram of a method of indicating a type of non-line-of-sight (NLOS) wireless signal path in a wireless communication network, according to an embodiment.

FIG. 6 is a flow diagram of a method 600 of indicating a type of non-line-of-sight (NLOS) wireless signal path in a wireless communication network, according to an embodiment. One or more of the functions of the method 600 may be performed by a computerized apparatus or system. Means for performing the functionality illustrated in one or more of the blocks shown in FIG. 6 may include hardware and/or software components of such computerized apparatus or system, such as, for example, a networked device (e.g., UE, base station), a computer system, or a computer-readable apparatus including a storage medium storing computer-readable and/or computer-executable instructions that are configured to, when executed by at least one processor apparatus, cause the at least one processor apparatus or another computerized apparatus to perform the functionality. Example components of a UE and a base station are illustrated in, e.g., FIGS. 7 and 8, which are described in more detail below.

It should also be noted that the operations of the method 600 may be performed in any suitable order, not necessarily the order depicted in FIG. 6. Further, the method 600 may include additional or fewer operations than those depicted in FIG. 6 to accomplish the indication of the type of NLOS.

At block 610, the functionality of method 600 may include wirelessly receiving a plurality of reference signals, the plurality of reference signals originating from a respective plurality of wireless network nodes. In some embodiments, the wireless network nodes may include base stations (e.g., gNBs) of the wireless communication network, and the reference signals may include positioning reference signals from the wireless network nodes (e.g., downlink PRSes). Wireless network nodes 402a-402c are examples of the wireless network nodes.

Figure 7:
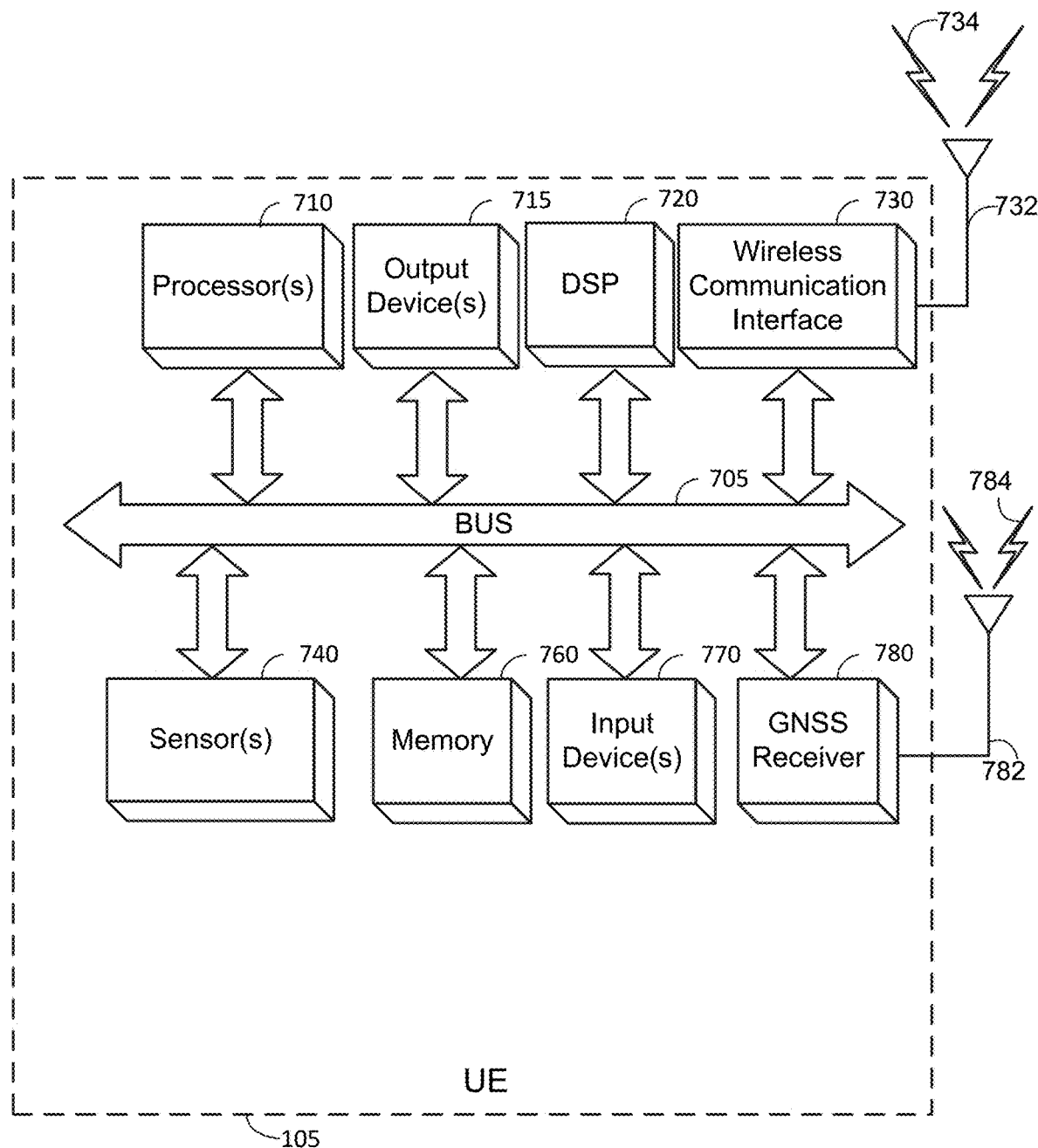
FIG. 7 is a block diagram of an embodiment of a UE, which can be utilized in embodiments as described herein.

Means for performing functionality at block 610 may comprise processor(s), memory, wireless communications interface, and/or other components of a UE or base station, as illustrated in FIG. 6 or 7.

At block 620, the functionality may include determining at least one NLOS wireless signal path based on the plurality of reference signals. One or more approaches may be taken to determine the NLOS wireless signal path. For example, in some implementations, the downlink measurement-based detection of NLOS may be used, where a UE may measure DL-AoA with PRSes transmitted from different wireless network nodes and evaluate them for similarity or commonality to infer and determine a likelihood of NLOS caused by a repeater. Such repeater may be configured to provide a wireless data connection to the plurality of wireless network nodes. As another example, in some implementations, scheduling an on/off pattern or sequence of PRS for a particular known repeater may be used to determine and evaluate TOA_on-TOA_off to infer and determine a likelihood of NLOS caused by the repeater.

Means for performing functionality at block 620 may comprise processor(s), memory, and/or other components of a UE or base station, as illustrated in FIG. 6 or 7.

At block 630, the functionality may include determining whether or not the at least one NLOS wireless signal path is introduced by a repeater of the wireless communication network based at least on a presence or an absence of a commonality among the plurality of reference signals. For instance, if different PRSes from different gNBs arrive via the same beam, then a UE can infer the presence of a repeater. If the PRSes arrive from different beams or angles, then there is a likelihood that the NLOS wireless signal path from elsewhere, e.g., reflections in the environment including buildings, walls, ground, hills, etc.

Means for performing functionality at block 630 may comprise processor(s), memory, and/or other components of a UE or base station, as illustrated in FIG. 6 or 7.

At block 640, the functionality may include indicating to a network entity whether the at least one NLOS wireless signal path is introduced by the repeater or not. In some embodiments, a UE may determine that the determined NLOS wireless signal path is introduced by a repeater of the wireless communication network, and indicate this information to a network entity, e.g., location server or LMF. The network entity may then implement remediation mechanisms based on this indication from the UE, as described elsewhere herein and below.

In some implementations, the NLOS indication may be an error indication type or a special error type in the LPP or the NRPPa. The UE may signal this by sending a report, where a code (e.g., error code), tag, binary indication, or other types of indicator may be included in the report to signal the network entity. In some cases, e.g., where the NLOS is not introduced by the repeater, PRS ID may be included in the report. In some implementations, this indication may be used by the location server to deploy the identified repeater as an additional anchor node for anchor-based positioning as described above.

Although the above blocks of method 600 are primarily described from the perspective of a UE, in some embodiments, the above blocks may be performed by a wireless network node with respect to other wireless network nodes.

Means for performing functionality at block 640 may comprise processor(s), memory, wireless communications interface, and/or other components of a UE or base station, as illustrated in FIG. 6 or 7.

Apparatus

FIG. 7 is a block diagram of an embodiment of a UE 105, which can be utilized as described herein above (e.g., in association with FIGS. 1-4 and 6). For example, the UE 105 can perform one or more of the functions of the method shown in FIG. 6. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 7.

The UE 105 is shown comprising hardware elements that can be electrically coupled via a bus 705 (or may otherwise be in communication, as appropriate). The hardware elements may include a processor(s) 710 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 710 may comprise one or more processing units, which may be housed in a single integrated circuit (IC) or multiple ICs. As shown in FIG. 7, some embodiments may have a separate DSP 720, depending on desired functionality. Location determination and/or other determinations based on wireless communication may be provided in the processor(s) 710 and/or wireless communication interface 730 (discussed below). The UE 105 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The UE 105 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 730 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2"

(3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Sensor(s) 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 780 capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 710, DSP 720, and/or a processor within the wireless communication interface 730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 710 or DSP 720.

The UE 105 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the UE 105 (and/or processor(s) 710 or DSP 720 within UE 105). In some embodiments, then, such code and/or instructions can be used to configure and/or adapt a general-purpose computer (or other device) to perform one or more operations in accordance with the described methods.

In some embodiments, the UE 105 may be configured to switch its communication mode to GNSS for positioning instead of, e.g., using a radio access network (e.g., FIG. 2) in a detected NLOS environment. This switch may be performed or caused via the processor(s) 710 and/or memory 760 based on, e.g., receipt of a signal from a location server that a NLOS wireless signal path is present, as described with regard to the communication-network-GNSS fusion approach above and FIG. 5.

Figure 8:
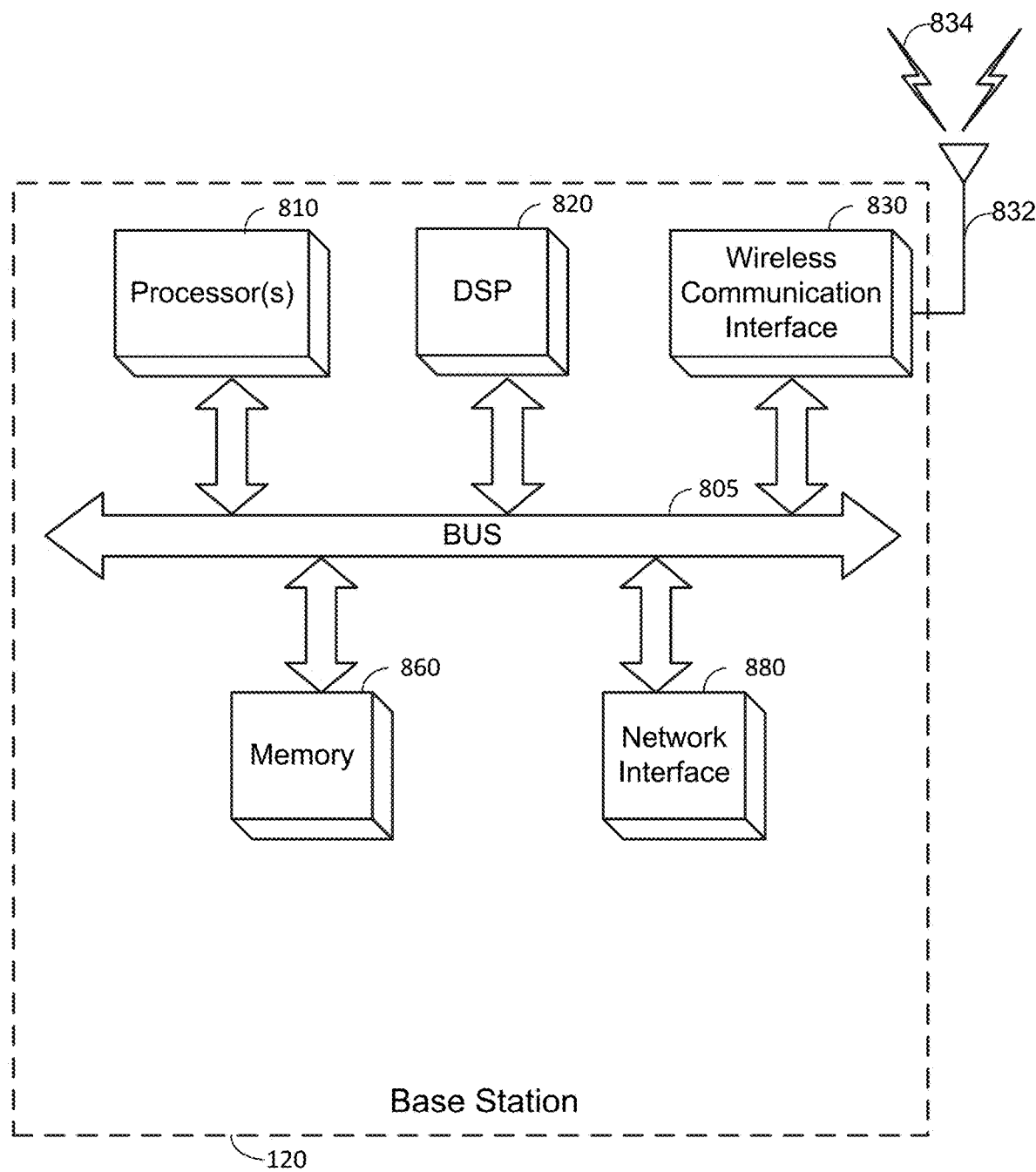
FIG. 8 is a block diagram of an embodiment of a base station, which can be utilized in embodiments as described herein.

FIG. 8 is a block diagram of an embodiment of a base station 120, which can be utilized as described herein above (e.g., in association with FIGS. 1-4 and 6). It should be noted that FIG. 8 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 805 (or may otherwise be in communication, as appropriate). The hardware elements may include a processor(s) 810 which can include without limitation one or more general-purpose processors, one or more special-purpose processors (such as DSP chips, graphics acceleration processors, ASICs, and/or the like), and/or other processing structure or means. As shown in FIG. 8, some embodiments may have a separate DSP 820, depending on desired functionality. Location determination and/or other determinations based on wireless communication may be provided in the processor(s) 810 and/or wireless communication interface 830 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 830 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 832 that send and/or receive wireless signals 834.

The base station 120 may also include a network interface 880, which can include support of wireline communication technologies. The network interface 880 may include a modem, network card, chipset, and/or the like. The network interface 880 may include one or more input and/or output communication interfaces to permit data to be exchanged with a network, communication network servers, computer systems, and/or any other electronic devices described herein.

In many embodiments, the base station 120 may further comprise a memory 860. The memory 860 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 860 of the base station 120 also may comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the base station 120 (and/or processor(s) 810 or DSP 820 within base station 120). In some embodiments, then, such code and/or instructions can be used to configure and/or adapt a general-purpose computer (or other device) to perform one or more operations in accordance with the described methods.

In some embodiments, the base station 120 may be configured to switch its communication mode to GNSS for positioning instead of, e.g., using a radio access network (e.g., FIG. 2) in a detected NLOS environment. This switch may be performed or caused via the processor(s) 810 and/or memory 860 based on, e.g., receipt of a signal from a location server that a NLOS wireless signal path is present, as described with regard to the communication-network-GNSS fusion approach above and FIG. 5.

FIG. 9 is a block diagram of an embodiment of a computer system 900, which may be used, in whole or in part, to provide the functions of one or more network components as described in the embodiments herein (e.g., location server 160 of FIGS. 1, 2 and 5). It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different geographical locations.

The computer system 900 is shown comprising hardware elements that can be electrically coupled via a bus 905 (or may otherwise be in communication, as appropriate). The hardware elements may include processor(s) 910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 900 also may comprise one or more input devices 915, which may comprise without limitation a mouse, a keyboard, a camera, a microphone, and/or the like; and one or more output devices 920, which may comprise without limitation a display device, a printer, and/or the like.

The computer system 900 may further include (and/or be in communication with) one or more non-transitory storage devices 925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 900 may also include a communications subsystem 930, which may comprise wireless communication technologies managed and controlled by a wireless communication interface 933, as well as wired technologies (such as Ethernet, coaxial communications, universal serial bus (USB), and the like). The wireless communication interface 933 may comprise one or more wireless transceivers that may send and receive wireless signals 955 (e.g., signals according to 5G NR or LTE) via wireless antenna(s) 950. Thus the communications subsystem 930 may comprise a modem, a network card (wireless or wired), an infrared communication device, a wireless communication device, and/or a chipset, and/or the like, which may enable the computer system 900 to communicate on any or all of the communication networks described herein to any device on the respective network, including a User Equipment (UE), base stations and/or other TRPs, and/or any other electronic devices described herein. Hence, the communications subsystem 930 may be used to receive and send data as described in the embodiments herein.

In many embodiments, the computer system 900 will further comprise a working memory 935, which may comprise a RAM or ROM device, as described above. Software elements, shown as being located within the working memory 935, may comprise an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the computer system 900 may be configured to implement processor(s) 910 and/or memory 935, based on a determination that NLOS is present, send a signal to a UE or base station to switch between a current positioning mode to another positioning mode. For example, the computer system 900 may instruct a UE within a coverage hole to switch to a GNSS-based positioning mode from a first positioning mode used with one or more wireless network nodes (e.g., gNBs), and may determine a position of the UE using the GNSS-based positioning mode and excluding positioning signals associated with the first positioning mode. The computer system 900 may also switch back to the first positioning mode.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of indicating a type of non-line-of-sight (NLOS) wireless signal path in a wireless communication network, the method comprising: receiving a plurality of reference signals, the plurality of reference signals originating from a respective plurality of wireless network nodes; determining at least one NLOS wireless signal path based on the plurality of reference signals; determining whether or not the at least one NLOS wireless signal path is introduced by a repeater of the wireless communication network based at least on a presence or an absence of a commonality among the plurality of reference signals; and indicating to a network entity whether the at least one NLOS wireless signal path is introduced by the repeater or not; wherein the repeater is configured to provide a data connection with the plurality of wireless network nodes.

Clause 2. The method of clause 1, wherein the plurality of reference signals comprise a plurality of downlink Positioning Reference Signals (PRS) sent by the respective plurality of wireless network nodes.

Clause 3. The method of any one of clauses 1-2 wherein the determining of the at least one NLOS wireless signal path based on the plurality of reference signals comprises: measuring angle of arrival (AoA) estimations based on the plurality of reference signals; and determining that the AoA estimations vary by less than a threshold amount.

Clause 4. The method of any one of clauses 1-3 wherein the determining of the at least one NLOS wireless signal path based on the plurality of reference signals comprises: disabling the repeater for a period of time; making a first measurement associated with a first reference signal received during the period of time; and based at least on a difference between the first measurement and a second measurement associated with a second reference signal received outside the period of time, determining that the at least one NLOS wireless signal path is introduced by the repeater.

Clause 5. The method of any one of clauses 1-4 wherein the commonality among the plurality of reference signals comprises a spatial relationship among the plurality of reference signals and a downlink beam from which the plurality of reference signals are received; and the method further comprises determining that the at least one NLOS wireless signal path is introduced by the repeater based on the presence of the commonality, or determining that the at least one NLOS wireless signal path is not introduced by the repeater based on the absence of the commonality.

Clause 6. The method of any one of clauses 1-5 wherein the indicating to the network entity comprises sending, to the network entity, information indicating that the at least one NLOS wireless signal path is introduced by the repeater; and the information is configured to be used in positioning of a user equipment (UE) by the network entity.

Clause 7. The method of any one of clauses 1-6 wherein the information is further configured to be used in positioning of the UE in conjunction with a known location of the repeater.

Clause 8. The method of any one of clauses 1-7 wherein the information is further configured to be used in positioning of the UE by: switching to a second positioning mode different from a first positioning mode used with the plurality of wireless network nodes; and determining a position of the UE using the second positioning mode and excluding positioning signals associated with the first positioning mode.

Clause 9. The method of any one of clauses 1-8 wherein the second positioning mode comprises Global Navigation Satellite System (GNSS)-based positioning of the UE.

Clause 10. A device comprising: one or more network interfaces; memory; and one or more processors communicatively coupled to the one or more network interfaces and the memory, and configured to: receive a plurality of reference signals, the plurality of reference signals originating from a respective plurality of wireless network nodes; determine at least one non-line-of-sight (NLOS) wireless signal path in the wireless communication network based on the plurality of reference signals; determine whether or not the at least one NLOS wireless signal path is introduced by a repeater of the wireless communication network based at least on a presence or an absence of a commonality among the plurality of reference signals; and indicate to a network entity whether the at least one NLOS wireless signal path is introduced by the repeater or not; wherein the repeater is configured to provide a data connection with the plurality of wireless network nodes.

Clause 11. The device of clause 10, wherein the plurality of reference signals comprise a plurality of downlink Positioning Reference Signals (PRS) sent by the respective plurality of wireless network nodes.

Clause 12. The device of any one of clauses 10-11 wherein the determination of the at least one NLOS wireless signal path based on the plurality of reference signals comprises: measurement of angle of arrival (AoA) estimations based on the plurality of reference signals; and determination that the AoA estimations vary by less than a threshold amount.

Clause 13. The device of any one of clauses 10-12 wherein the determination of the at least one NLOS wireless signal path based on the plurality of reference signals comprises: disabling the repeater for a period of time; a first measurement associated with a first reference signal received during the period of time; and based at least on a difference between the first measurement and a second measurement associated with a second reference signal received outside the period of time, determination that the at least one NLOS wireless signal path is introduced by the repeater.

Clause 14. The device of any one of clauses 10-13 wherein the commonality among the plurality of reference signals comprises a spatial relationship among the plurality of reference signals and a downlink beam from which the plurality of reference signals are received; and the one or more processors are further configured to: determine that the at least one NLOS wireless signal path is introduced by the repeater based on the presence of the commonality, or determine that the at least one NLOS wireless signal path is not introduced by the repeater based on the absence of the commonality.

Clause 15. The device of any one of clauses 10-14 wherein the indication to the network entity comprises sending, to the network entity, information indicating that the at least one NLOS wireless signal path is introduced by the repeater; and the information is configured to be used in positioning of a user equipment (UE) by the network entity.

Clause 16. The device of any one of clauses 10-15 wherein the information is further configured to be used in positioning of the UE in conjunction with a known location of the repeater.

Clause 17. The device of any one of clauses 10-16 wherein the information is further configured to be used in positioning of the UE by: switching to a second positioning mode different from a first positioning mode used with the plurality of wireless network nodes; and determining a position of the UE using the second positioning mode and excluding positioning signals associated with the first positioning mode; and the second positioning mode comprises Global Navigation Satellite System (GNSS)-based positioning of the UE.

Clause 18. A non-transitory computer-readable apparatus comprising a storage medium, the storage medium comprising a plurality of instructions configured to, when executed by one or more processors, cause a computerized apparatus to: receive a plurality of reference signals, the plurality of reference signals originating from a respective plurality of wireless network nodes; determine at least one non-line-of-sight (NLOS)

wireless signal path in a wireless communication network based on the plurality of reference signals; determine whether or not the at least one NLOS wireless signal path is introduced by a repeater of the wireless communication network based at least on a presence or an absence of a commonality among the plurality of reference signals; and indicate to a network entity whether the at least one NLOS wireless signal path is introduced by the repeater or not; wherein the repeater is configured to provide a data connection with the plurality of wireless network nodes.

Clause 19. The non-transitory computer-readable apparatus of clause 18, wherein the plurality of reference signals comprise a plurality of downlink Positioning Reference Signals (PRS) sent by the respective plurality of wireless network nodes.

Clause 20. The non-transitory computer-readable apparatus of any one of clauses 18-19 wherein the determination of the at least one NLOS wireless signal path based on the plurality of reference signals comprises: measurement of angle of arrival (AoA) estimations based on the plurality of reference signals; and determination that the AoA estimations vary by less than a threshold amount.

Clause 21. The non-transitory computer-readable apparatus of any one of clauses 18-20 wherein the determination of the at least one NLOS wireless signal path based on the plurality of reference signals comprises: disabling the repeater for a period of time; a first measurement associated with a first reference signal received during the period of time; and based at least on a difference between the first measurement and a second measurement associated with a second reference signal received outside the period of time, determination that the at least one NLOS wireless signal path is introduced by the repeater.

Clause 22. The non-transitory computer-readable apparatus of any one of clauses 18-21 wherein the commonality among the plurality of reference signals comprises a spatial relationship among the plurality of reference signals and a downlink beam from which the plurality of reference signals are received; and the plurality of instructions are further configured to, when executed by the one or more processors, cause the computerized apparatus to: determine that the at least one NLOS wireless signal path is introduced by the repeater based on the presence of the commonality, or determine that the at least one NLOS wireless signal path is not introduced by the repeater based on the absence of the commonality.

Clause 23. The non-transitory computer-readable apparatus of any one of clauses 18-22 wherein the indication to the network entity comprises sending, to the network entity, information indicating that the at least one NLOS wireless signal path is introduced by the repeater; and the information is configured to be used in positioning of the UE by the network entity.

Clause 24. The non-transitory computer-readable apparatus of any one of clauses 18-23 wherein the information is further configured to be used in positioning of the UE by: switching to a second positioning mode different from a first positioning mode used with the plurality of wireless network nodes; and determining a position of the UE using the second positioning mode and excluding positioning signals associated with the first positioning mode; and the second positioning mode comprises Global Navigation Satellite System (GNSS)-based positioning of the UE.

Clause 25. An apparatus comprising: means for receiving a plurality of reference signals, the plurality of reference signals originating from a respective plurality of wireless network nodes; means for determining at least one NLOS wireless signal path in a wireless communication network based on the plurality of reference signals; means for determining whether or not the at least one NLOS wireless signal path is introduced by a repeater of the wireless communication network based at least on a presence or an absence of a commonality among the plurality of reference signals; and means for indicating to a network entity whether the at least one NLOS wireless signal path is introduced by the repeater or not; wherein the repeater is configured to provide a data connection with the plurality of wireless network nodes.

Clause 26. The apparatus of clause 25, wherein the plurality of reference signals comprise a plurality of downlink Positioning Reference Signals (PRS) sent by the respective plurality of wireless network nodes.

Clause 27. The apparatus of any one of clauses 25-26 wherein the means for determining the at least one NLOS wireless signal path based on the plurality of reference signals comprises: means for measuring angle of arrival (AoA) estimations based on the plurality of reference signals; and means for determining that the AoA estimations vary by less than a threshold amount.

Clause 28. The apparatus of any one of clauses 25-27 wherein the means for determining the at least one NLOS wireless signal path based on the plurality of reference signals comprises: means for disabling the repeater for a period of time; means for making a first measurement associated with a first reference signal received during the period of time; and means for, based at least on a difference between the first measurement and a second measurement associated with a second reference signal received outside the period of time, determining that the at least one NLOS wireless signal path is introduced by the repeater.

Clause 29. The apparatus of any one of clauses 25-28 wherein the commonality among the plurality of reference signals comprises a spatial relationship among the plurality of reference signals and a downlink beam from which the plurality of reference signals are received; and the computerized apparatus further comprises: means for (i) determining that the at least one NLOS wireless signal path is introduced by the repeater based on the presence of the commonality, or (ii) determining that the at least one NLOS wireless signal path is not introduced by the repeater based on the absence of the commonality.

Clause 30. The apparatus of any one of clauses 25-29 wherein the means for indicating to the network entity comprises means for sending, to the network entity, information indicating that the at least one NLOS wireless signal path is introduced by the repeater; the information is further configured to be used in positioning of the UE by: switching to a second positioning mode different from a first positioning mode used with the plurality of wireless network nodes; and determining a position of the UE using the second positioning mode and excluding positioning signals associated with the first positioning mode; and the second positioning mode comprises Global Navigation Satellite System (GNSS)-based positioning of the UE.

What is claimed is:

1. A method of indicating a type of non-line-of-sight (NLOS) wireless signal path in a wireless communication network, the method comprising:
receiving a plurality of reference signals, the plurality of reference signals originating from a respective plurality of wireless network nodes;
determining at least one NLOS wireless signal path based on the plurality of reference signals;
determining whether or not the at least one NLOS wireless signal path is introduced by a repeater of the wireless communication network based at least on a presence or an absence of a commonality among the plurality of reference signals; and
indicating to a network entity whether the at least one NLOS wireless signal path is introduced by the repeater or not;
wherein the repeater is configured to provide a data connection with the plurality of wireless network nodes.

2. The method of claim 1, wherein the plurality of reference signals comprise a plurality of downlink Positioning Reference Signals (PRS) sent by the respective plurality of wireless network nodes.

3. The method of claim 1, wherein the determining of the at least one NLOS wireless signal path based on the plurality of reference signals comprises:
measuring angle of arrival (AoA) estimations based on the plurality of reference signals; and
determining that the AoA estimations vary by less than a threshold amount.

4. The method of claim 1, wherein the determining of the at least one NLOS wireless signal path based on the plurality of reference signals comprises:
disabling the repeater for a period of time;
making a first measurement associated with a first reference signal received during the period of time; and
based at least on a difference between the first measurement and a second measurement associated with a second reference signal received outside the period of time, determining that the at least one NLOS wireless signal path is introduced by the repeater.

5. The method of claim 1, wherein:
the commonality among the plurality of reference signals comprises a spatial relationship among the plurality of reference signals and a downlink beam from which the plurality of reference signals are received; and
the method further comprises determining that the at least one NLOS wireless signal path is introduced by the repeater based on the presence of the commonality, or determining that the at least one NLOS wireless signal path is not introduced by the repeater based on the absence of the commonality.

6. The method of claim 1, wherein:
indicating to the network entity comprises sending, to the network entity, information indicating that the at least one NLOS wireless signal path is introduced by the repeater; and
the information is configured to be used in positioning of a user equipment (UE) by the network entity.

7. The method of claim 6, wherein the information is further configured to be used in positioning of the UE in conjunction with a known location of the repeater.

8. The method of claim 6, wherein the information is further configured to be used in positioning of the UE by:
switching to a second positioning mode different from a first positioning mode used with the plurality of wireless network nodes; and
determining a position of the UE using the second positioning mode and excluding positioning signals associated with the first positioning mode.

9. The method of claim 8, wherein the second positioning mode comprises Global Navigation Satellite System (GNSS)-based positioning of the UE.

10. A device comprising:
one or more network interfaces;
memory; and
one or more processors communicatively coupled to the one or more network interfaces and the memory, and configured to:
receive a plurality of reference signals, the plurality of reference signals originating from a respective plurality of wireless network nodes;
determine at least one non-line-of-sight (NLOS) wireless signal path in the wireless communication network based on the plurality of reference signals;
determine whether or not the at least one NLOS wireless signal path is introduced by a repeater of the wireless communication network based at least on a presence or an absence of a commonality among the plurality of reference signals; and
indicate to a network entity whether the at least one NLOS wireless signal path is introduced by the repeater or not;
wherein the repeater is configured to provide a data connection with the plurality of wireless network nodes.

11. The device of claim 10, wherein the plurality of reference signals comprise a plurality of downlink Positioning Reference Signals (PRS) sent by the respective plurality of wireless network nodes.

12. The device of claim 10, wherein the determination of the at least one NLOS wireless signal path based on the plurality of reference signals comprises:
measurement of angle of arrival (AoA) estimations based on the plurality of reference signals; and
determination that the AoA estimations vary by less than a threshold amount.

13. The device of claim 10, wherein the determination of the at least one NLOS wireless signal path based on the plurality of reference signals comprises:
disabling the repeater for a period of time;
a first measurement associated with a first reference signal received during the period of time; and
based at least on a difference between the first measurement and a second measurement associated with a second reference signal received outside the period of time, determination that the at least one NLOS wireless signal path is introduced by the repeater.

14. The device of claim 10, wherein:
the commonality among the plurality of reference signals comprises a spatial relationship among the plurality of reference signals and a downlink beam from which the plurality of reference signals are received; and
the one or more processors are further configured to:
determine that the at least one NLOS wireless signal path is introduced by the repeater based on the presence of the commonality, or determine that the at least one NLOS wireless signal path is not introduced by the repeater based on the absence of the commonality.

15. The device of claim 10, wherein:
   the indication to the network entity comprises sending, to the network entity, information indicating that the at least one NLOS wireless signal path is introduced by the repeater; and
   the information is configured to be used in positioning of a user equipment (UE) by the network entity.

16. The device of claim 15, wherein the information is further configured to be used in positioning of the UE in conjunction with a known location of the repeater.

17. The device of claim 15, wherein:
   the information is further configured to be used in positioning of the UE by:
      switching to a second positioning mode different from a first positioning mode used with the plurality of wireless network nodes; and
      determining a position of the UE using the second positioning mode and excluding positioning signals associated with the first positioning mode; and
   the second positioning mode comprises Global Navigation Satellite System (GNSS)-based positioning of the UE.

18. A non-transitory computer-readable apparatus comprising a storage medium, the storage medium comprising a plurality of instructions configured to, when executed by one or more processors, cause a computerized apparatus to:
   receive a plurality of reference signals, the plurality of reference signals originating from a respective plurality of wireless network nodes;
   determine at least one non-line-of-sight (NLOS) wireless signal path in a wireless communication network based on the plurality of reference signals;
   determine whether or not the at least one NLOS wireless signal path is introduced by a repeater of the wireless communication network based at least on a presence or an absence of a commonality among the plurality of reference signals; and
   indicate to a network entity whether the at least one NLOS wireless signal path is introduced by the repeater or not;
   wherein the repeater is configured to provide a data connection with the plurality of wireless network nodes.

19. The non-transitory computer-readable apparatus of claim 18, wherein the plurality of reference signals comprise a plurality of downlink Positioning Reference Signals (PRS) sent by the respective plurality of wireless network nodes.

20. The non-transitory computer-readable apparatus of claim 18, wherein the determination of the at least one NLOS wireless signal path based on the plurality of reference signals comprises:
   measurement of angle of arrival (AoA) estimations based on the plurality of reference signals; and
   determination that the AoA estimations vary by less than a threshold amount.

21. The non-transitory computer-readable apparatus of claim 18, wherein the determination of the at least one NLOS wireless signal path based on the plurality of reference signals comprises:
   disabling the repeater for a period of time;
   a first measurement associated with a first reference signal received during the period of time; and
   based at least on a difference between the first measurement and a second measurement associated with a second reference signal received outside the period of time, determination that the at least one NLOS wireless signal path is introduced by the repeater.

22. The non-transitory computer-readable apparatus of claim 18, wherein:
   the commonality among the plurality of reference signals comprises a spatial relationship among the plurality of reference signals and a downlink beam from which the plurality of reference signals are received; and
   the plurality of instructions are further configured to, when executed by the one or more processors, cause the computerized apparatus to: determine that the at least one NLOS wireless signal path is introduced by the repeater based on the presence of the commonality, or determine that the at least one NLOS wireless signal path is not introduced by the repeater based on the absence of the commonality.

23. The non-transitory computer-readable apparatus of claim 18, wherein:
   the indication to the network entity comprises sending, to the network entity, information indicating that the at least one NLOS wireless signal path is introduced by the repeater; and
   the information is configured to be used in positioning of the UE by the network entity.

24. The non-transitory computer-readable apparatus of claim 23, wherein:
   the information is further configured to be used in positioning of the UE by:
      switching to a second positioning mode different from a first positioning mode used with the plurality of wireless network nodes; and
      determining a position of the UE using the second positioning mode and excluding positioning signals associated with the first positioning mode; and
   the second positioning mode comprises Global Navigation Satellite System (GNSS)-based positioning of the UE.

25. An apparatus comprising:
   means for receiving a plurality of reference signals, the plurality of reference signals originating from a respective plurality of wireless network nodes;
   means for determining at least one NLOS wireless signal path in a wireless communication network based on the plurality of reference signals;
   means for determining whether or not the at least one NLOS wireless signal path is introduced by a repeater of the wireless communication network based at least on a presence or an absence of a commonality among the plurality of reference signals; and
   means for indicating to a network entity whether the at least one NLOS wireless signal path is introduced by the repeater or not;
   wherein the repeater is configured to provide a data connection with the plurality of wireless network nodes.

26. The apparatus of claim 25, wherein the plurality of reference signals comprise a plurality of downlink Positioning Reference Signals (PRS) sent by the respective plurality of wireless network nodes.

27. The apparatus of claim 25, wherein the means for determining the at least one NLOS wireless signal path based on the plurality of reference signals comprises:
   means for measuring angle of arrival (AoA) estimations based on the plurality of reference signals; and
   means for determining that the AoA estimations vary by less than a threshold amount.

28. The apparatus of claim 25, wherein the means for determining the at least one NLOS wireless signal path based on the plurality of reference signals comprises:
- means for disabling the repeater for a period of time;
- means for making a first measurement associated with a first reference signal received during the period of time; and
- means for, based at least on a difference between the first measurement and a second measurement associated with a second reference signal received outside the period of time, determining that the at least one NLOS wireless signal path is introduced by the repeater.

29. The apparatus of claim 25, wherein:
- the commonality among the plurality of reference signals comprises a spatial relationship among the plurality of reference signals and a downlink beam from which the plurality of reference signals are received; and
- the computerized apparatus further comprises: means for (i) determining that the at least one NLOS wireless signal path is introduced by the repeater based on the presence of the commonality, or (ii) determining that the at least one NLOS wireless signal path is not introduced by the repeater based on the absence of the commonality.

30. The apparatus of claim 29, wherein:
- the means for indicating to the network entity comprises means for sending, to the network entity, information indicating that the at least one NLOS wireless signal path is introduced by the repeater;
- the information is further configured to be used in positioning of the UE by:
  - switching to a second positioning mode different from a first positioning mode used with the plurality of wireless network nodes; and
  - determining a position of the UE using the second positioning mode and excluding positioning signals associated with the first positioning mode; and
- the second positioning mode comprises Global Navigation Satellite System (GNSS)-based positioning of the UE.

* * * * *